(12) United States Patent
Kumar et al.

(10) Patent No.: US 10,324,908 B2
(45) Date of Patent: Jun. 18, 2019

(54) EXPOSING DATABASE ARTIFACTS

(71) Applicant: SAP SE, Walldorf (DE)

(72) Inventors: Apoorva Kumar, Dublin (IE); Suresh Pasumarthi, Bangalore (IN); C Sachin, Kerala (IN)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 15/254,388

(22) Filed: Sep. 1, 2016

(65) Prior Publication Data

US 2018/0060366 A1    Mar. 1, 2018

(51) Int. Cl.
*G06F 16/21*    (2019.01)
*G06F 16/25*    (2019.01)

(52) U.S. Cl.
CPC .......... *G06F 16/212* (2019.01); *G06F 16/258* (2019.01)

(58) Field of Classification Search
CPC .... G06F 16/258; G06F 17/194; G06F 16/211; G06F 16/212
See application file for complete search history.

(56) References Cited

U.S. PATENT DOCUMENTS

| | | | | |
|---|---|---|---|---|
| 2003/0120651 A1* | 6/2003 | Bernstein | ................ | G06F 16/86 |
| 2006/0200645 A1* | 9/2006 | Kumar | ...................... | G06F 8/36 |
| | | | | 712/1 |
| 2006/0265699 A1* | 11/2006 | Ali | ........................... | G06F 8/74 |
| | | | | 717/141 |
| 2007/0089103 A1* | 4/2007 | Iborra | ....................... | G06F 8/30 |
| | | | | 717/141 |
| 2007/0255751 A1* | 11/2007 | Bansal | ...................... | G06F 8/10 |
| 2009/0193050 A1* | 7/2009 | Olson | ................... | G06F 16/211 |
| 2010/0169306 A1* | 7/2010 | Chatterjee | ......... | G06F 17/30412 |
| | | | | 707/736 |
| 2012/0124547 A1* | 5/2012 | Halbedel | ........... | G06F 17/30964 |
| | | | | 717/100 |
| 2013/0110879 A1* | 5/2013 | Winternitz | .............. | G06F 16/23 |
| | | | | 707/792 |
| 2014/0136257 A1* | 5/2014 | Amulu | ................. | G06Q 10/067 |
| | | | | 705/7.15 |
| 2014/0250121 A1* | 9/2014 | Kieselbach | ....... | G06F 17/30595 |
| | | | | 707/736 |
| 2015/0149445 A1* | 5/2015 | Foebel | .............. | G06F 17/30371 |
| | | | | 707/722 |
| 2015/0149985 A1* | 5/2015 | Foebel | .............. | G06F 17/30371 |
| | | | | 717/131 |

* cited by examiner

*Primary Examiner* — David T. Brooks
(74) *Attorney, Agent, or Firm* — Schwegman Lundberg & Woessner, P.A.

(57) ABSTRACT

Various examples are directed to exposing database artifacts. For example, a rules engine may receive schema data describing a database schema of an in-memory database. The schema data may describe a table, a view, and a procedure. The rules engine may generate a data model comprising a plurality of translation artifacts including a table translation artifact describing a table of the database schema, a view translation artifact describing a view of the database schema, and a procedure translation artifact describing a procedure of the database schema. A mapping service may receive from a client application a first client request comprising first metadata describing the view translation artifact. The mapping service may initiate execution of the view at an in-memory database to determine a view result; and send the view result to the client application.

19 Claims, 14 Drawing Sheets

EXPOSING DATABASE ARTIFACTS

TECHNICAL FIELD

This document generally relates to methods and systems for use with computer networks. More particularly, this document relates to the generation and use of a mapping service for exposing database artifacts to client applications.

BACKGROUND

Databases are used in many business applications to store large quantities of data, which is often provided at high velocity and great variety. Different database schemas have different ways of storing and processing these data in the form of artifacts like tables, views, functions, and stored procedures. Client applications access a database to perform various processing tasks utilizing data stored at the database, such as, for example, providing user interfaces (UIs), providing various business services, etc. To access data at a database, client applications can access a database directly using a Structured Query Language (SQL). Accessing a database in this way, however, generally has the client application account for details of the database schema and artifacts including the name and content of different artifacts and the relational integrity of the tables. This adds complexity to client applications and reduces client application flexibility.

BRIEF DESCRIPTION OF DRAWINGS

The present disclosure is illustrated by way of example and not limitation in the following figures.

DETAILED DESCRIPTION

Figure 1A:
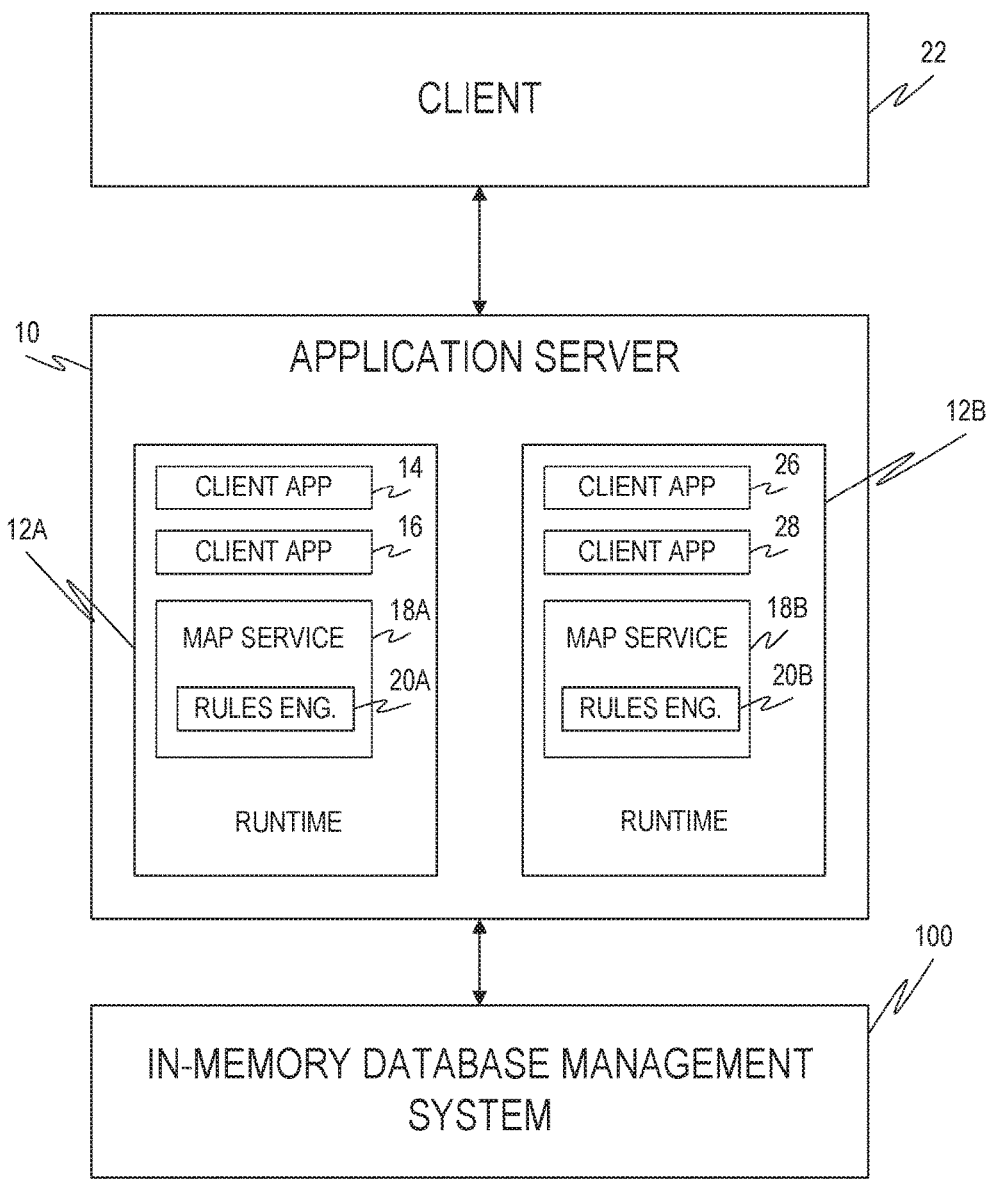
FIG. 1A is a diagram illustrating one example of an application server for exposing database artifacts.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In many database implementations, client applications access data stored at a database to perform various functions such as, for example, providing user interfaces (UIs), other database utilities, etc. A client application, in some examples, can access a database using queries organized according to Structured Query Language (SQL) or another syntax supported by the database. A client application that utilizes database-specific queries, however, also needs to account for specifics of the database schema including, for example, the names of different tables and artifacts, the relational integrity of the tables and artifacts, etc. This adds complexity and database-specific programming to the client applications.

According to various examples, a database management system includes or is in communication with a mapping service that translates artifacts of the database (e.g., tables, views, functions, etc.) into a format that may be consumable by client applications without accounting for particulars of the database schema. In some examples described herein, the mapping service is implemented at an application server in communication with a database management system of the database. The application server may include one or more runtimes hosting client applications that access the database. The runtimes may also include a mapping service that receives client requests from the client applications. Client requests may include or reference translation artifacts. For example, a client request may include a name of a translation artifact. In some examples, the client request also includes one or more input parameters and/or other data as described herein. The mapping service translates the referenced translation artifact to a database artifact such as a table, a view, a function, a procedure, etc. that may be executed at the database management system. In some examples, the mapping service may also capture security constraints of the database artifacts. For example, a translation artifact may note a security status (e.g., read-only) of a table, view, function, procedure, etc. The mapping service may provide results of the database artifact to the requesting client application.

In some examples, the runtimes include rules engines. A rules engine may generate a data model that includes translation artifacts and data mapping the translation artifacts to corresponding database artifacts. The mapping service may incorporate knowledge of the database schema implemented by the database including, for example, knowledge of the different tables of the database, referential integrity of the database, hierarchies of the database, and other artifacts included in the schema. In some examples, translation artifacts may be formatted according to an OData protocol, such the OData V4 protocol. The mapping service may translate OData translation artifacts to database artifacts. In some examples, the runtimes and/or mapping services described herein may be executed at a database management system instead of at an application server.

Implementing the mapping functionality of the mapping service at an application server (or as part of the database management system) instead of at the client application provides benefits, for example, by reducing the complexity and development difficulties of the client applications. Positioning the mapping service at the application server may also provide additional benefits when the database is an in-memory database such as, for example, the HANA system from SAP AG of Walldorf, Germany. An in-memory database is a database management system that primarily relies on main memory for computer data storage. This is different than database management systems that primarily employ a disk storage mechanism. An in-memory database is often able to access data with memory access requests as opposed to disk access requests. Because memory access is typically faster than disk access, this may allow in-memory databases to access data and execute artifacts faster and more efficiently than disk-based databases. Accordingly, positioning the mapping service and associated artifact processing at the database management system may allow client applications to leverage the performance benefits of in-memory processing.

Implementing a mapping service between client applications and a database using a database management system-side mapping service and data model, as described herein, may provide certain benefits over client side implementations. For example, it may not be necessary for client side applications to account for the particulars of the database schema. Instead, client applications may only need to know the translation artifacts included in the data model to access a complex array of database artifacts. Also, for example, the data model and requests may be implemented to utilize a standard artifact protocol, such as the OData protocol (one example is OData V4). Additionally, when an in-memory database is used, locating artifact processing at the database management system may allow client applications to exploit the performance benefits of the in-memory database structure.

FIG. 1A is a diagram illustrating one example of an application server 10 for exposing database artifacts. The application server 10 is in communication with a client 22 and with an in-memory database management system 100. For example, the client 22 may be a web browser executed at a client computing device for accessing client applications 14, 16, 26, 28 hosted by the application server 10.

The application server 10 may be or include any suitable server, servers, and/or other computing devices to execute the components described herein. For example, the application server 10 may execute one or more runtimes 12A, 12B. Runtimes 12A, 12B may support client applications 14, 16, 26, 28 of different programming languages. For example, runtime 12A may be a Java runtime, such as an Apache Tomcat/TomEE runtime to support client applications 14, 16 of the Java programming language. Runtime 12B may be a JavaScript runtime to support client applications 26, 28 of the JavaScript programming language. The client 22 may access one or more of the client applications 14, 16, 26, 28 via the application server 10.

The runtimes 12A, 12B may include mapping services 18A, 18B. The mapping services 18A, 18B may receive client requests from the respective client applications 14, 16, 26, 28. Client requests, as described herein, may reference one or more translation artifacts, which may be formatted according to a protocol such as OData. (e.g., OData V4). The mapping services 18A. 18B may map the referenced translation artifacts to corresponding database artifacts, as described herein. In some examples, mapping services 18A, 18B may include respective rules engines 20A, 20B. Rules engines 20A, 20B may create a data model including translation artifacts that may be referenced by the client applications 14, 16, 26, 28 to access database artifacts at the in-memory database management system 100, for example, as described herein. Additional details describing how the rules engines 20A, 20B may generate the data model are provided herein, for example, at FIGS. 4-11.

Database artifacts to be exposed by the mapping services 18A, 18B may include any data or function provided by the database schema. For example, a table may return some or all of the data included in the schema. A view may return data derived from one or more tables of the schema arranged in a format associated with the view. Procedure and function database artifacts may return data from the one or more tables of the database schema and/or perform other processing according to input parameters. The translation artifact for a database artifact may include appropriate relationships, function imports, action imports, and/or complex types associated with the corresponding database artifact.

A client application 14, 16, 26, 28 may send a client request to the mapping service 18A, 18B. The client request may include a translation artifact describing a requested database artifact. The metadata may reference a translation artifact from a data model. For example, the client applications 14, 16, 26, 28 may include a client library including some or all of the translation artifacts of the data model generated by the respective mapping service 18A, 18B. The client request may be formatted according to any suitable protocol, such as, for example, Java Script Object Notation (JSON) or eXtensible Markup Language (XML). The translation artifact may be formatted according to any suitable metadata protocol, such as for example, OData (one example is OData V4). In addition to the translation artifact, the client request may include other data, such as, for example, an identification of the requesting client application 14, 16, 26, 28 input parameters for the requested database artifact, etc.

The mapping services 18A. 18B may process the client request and determine one or more translation artifacts from the data model that are referenced by the client request. The mapping service 18A, 18B may respond to the client request by initiating processing of the referenced database artifact at the database management system 100. Results of the database artifact (if any) are returned to the requesting client application 14, 16, 26, 28. In this way, client applications 14, 16, 26, 28 may not need to account for these schema particulars and, instead, may access the artifacts using metadata that references the appropriate translation artifact.

Figure 1B:
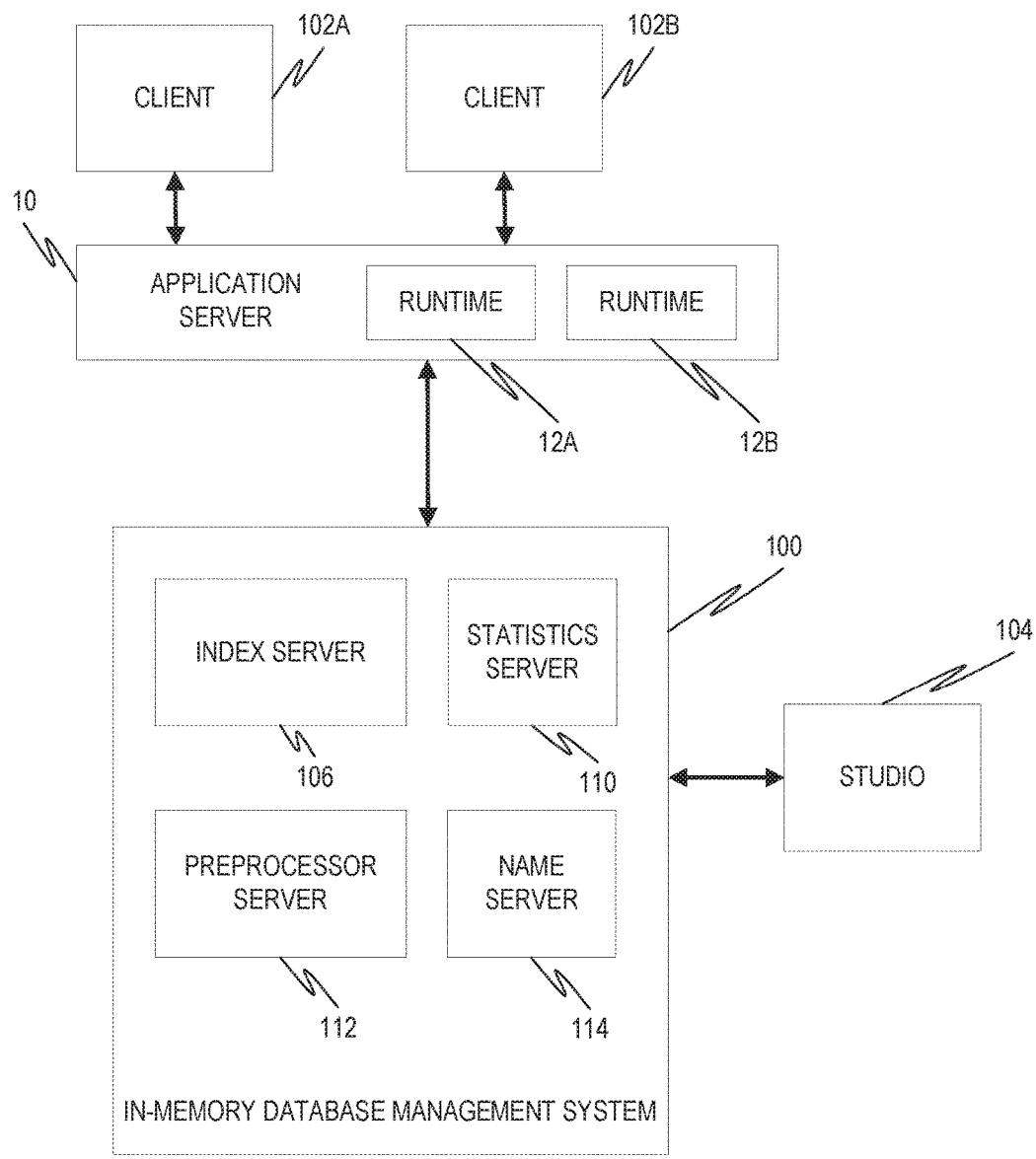
FIG. 1B is a diagram illustrating an example of the in-memory database management system in communication with an extended application services (XS) engine application server.

FIG. 1B is a diagram illustrating an example of the in-memory database management system 100 in communication with the application server 10. The application server 10 may be in communication with example clients 102A, 102B and may execute runtimes 12A, 12B, as described herein. In some examples (e.g., when the database management system 100 is an example of the HANA system from SAP AG of Walldorf, Germany), the application server 10 may be or comprise a HANA XS server. In some examples, the application server 10 may provide services in addition to the mapping service described herein. For example, the application server 10 may allow clients to connect to the in-memory database management system 100 using web protocols, such as Hypertext Transfer Protocol (HTTP).

Some client applications, such as 14, 16, 26, 28 shown in FIG. 1A may communicate with the in-memory database management system 100 utilizing mapping services. Some of the client applications 14, 16, 26, 28 may also (or alternatively) communicate with the in-memory database management system 100 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 1B also shows a studio 104 that may be used to perform modeling by accessing the in-memory database management system 100. In some examples, the studio 104 can allow complex analysis to be performed on data drawn not only from real-time event data and windows, but also from stored database information. The in-memory database management system 100 may comprise a number of different components, including an index server 106, a statistics server 110, a preprocessor server 112, and a name server 114. These components may operate on a single computing device, or may be spread among multiple computing devices (e.g., separate servers). The index server 106 contains the actual data and the engines for processing the data. It may also coordinate and uses the other servers.

The statistics server 110 collects information about status, performance, and resource consumption from all the other server components. The statistics server 110 can be accessed from the studio 104 to obtain the status of various alert monitors.

The preprocessor server 112 is used for analyzing text data and extracting the information on which the text search capabilities are based.

The name server 114 holds information about the database topology. This is used in a distributed system with instances of the database on different hosts. The name server 114 knows where the components are running and which data is located on which server. In an example embodiment, a separate enqueue server may operate in the manner described above, specifically with regard to creating and managing light-weight etiquette sessions.

Figure 2:
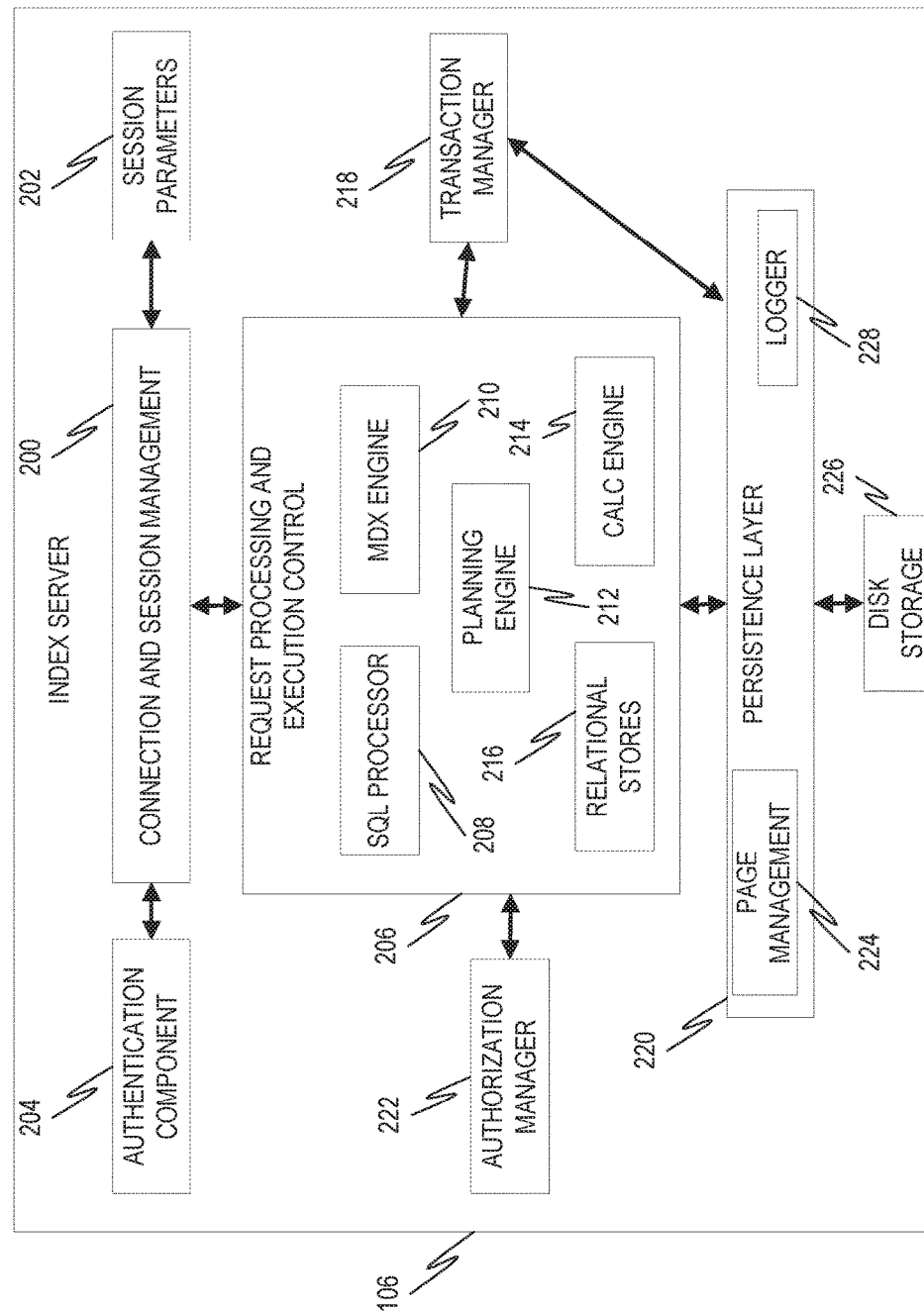
FIG. 2 is a diagram illustrating an example of an index server of the example in-memory database management system of FIG. 1.

FIG. 2 is a diagram illustrating an example of the index server 106. Specifically, the index server 106 of FIG. 1B is depicted in more detail. The index server 106 includes a connection and session management component 200, which is responsible for creating and managing sessions and connections for the database clients. Once a session is established, clients can communicate with the database management system 100 using SQL statements. In some examples, a mapping service 18A, 18B (FIG. 1A) may communicate with components of the database management system 100, using SQL or other suitable statements. For each session, a set of session parameters 202 may be maintained, such as auto-commit, current transaction isolation level, etc. Users (e.g., system administrators, developers) may be authenticated by the database system itself (e.g., by logging in with user name and password, using an authentication component 204) or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. Multidimensional expressions (MDX) is a language for querying and manipulating multidimensional data stored in OLAP cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calculation engine 214 implements the various SQL script and planning operations. The calculation engine 214 creates a logical execution plan for calculation models derived from SQL script, MDX, planning, and domain-specific models. This logical execution plan may include, for example, breaking up a model into operations that can be processed in parallel. The data is stored in relational stores 216, which implement a relational database in main memory. Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database management system 100 components to check whether the user has the specified privileges to execute the requested operations. The database management system 100 allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to a separate disk storage 226, and also contains a logger 228 that manages the transaction log. Log entries can be written implicitly by the persistence layer 220 when data is written via the persistence interface or explicitly by using a log interface.

Figure 3:
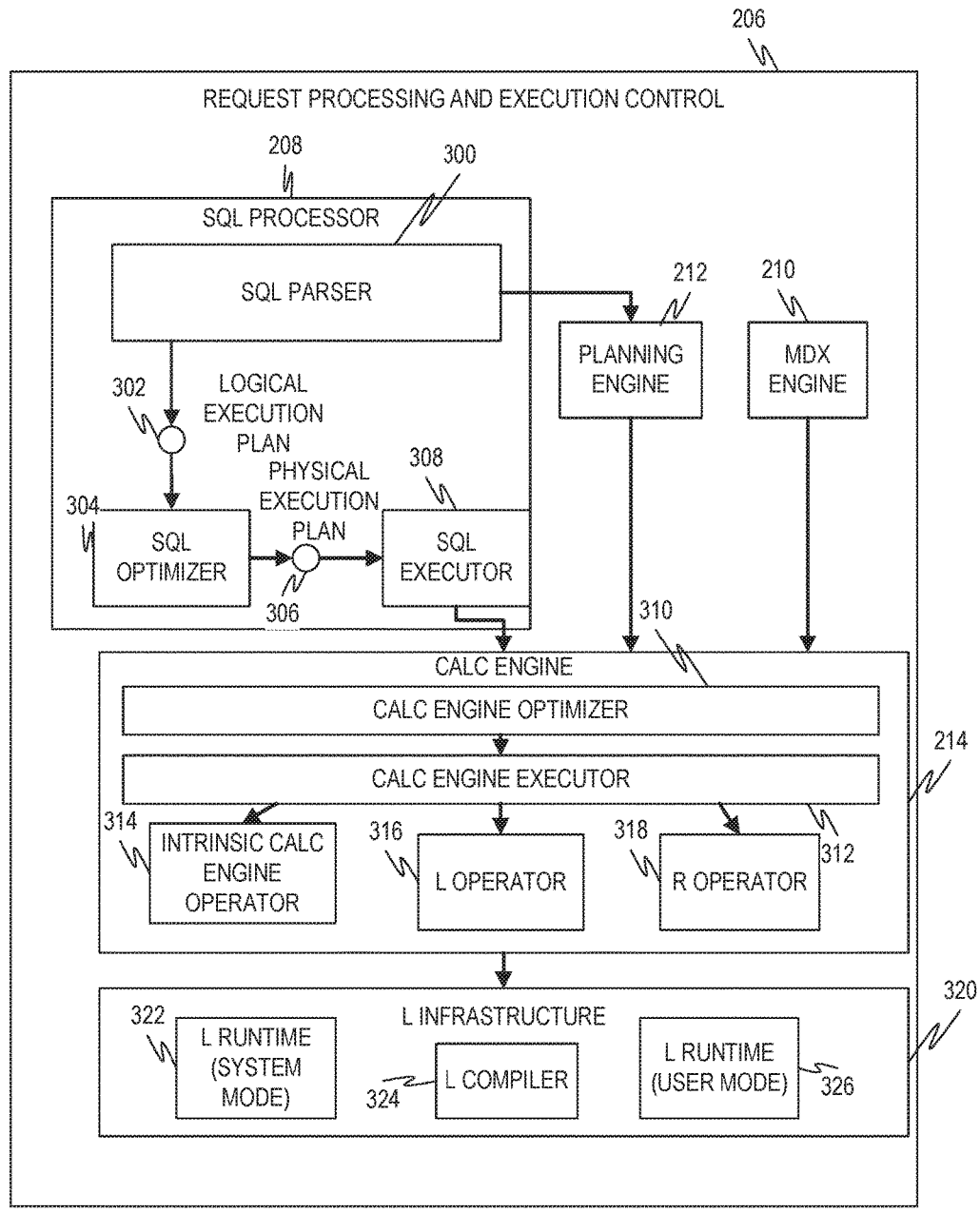
FIG. 3 is a diagram illustrating one example of the request processing and execution control of FIG. 2.

FIG. 3 is a diagram illustrating one example of the request processing and execution control 206. This diagram depicts the request processing and execution control 206 of FIG. 2 in more detail. The SQL processor 208 contains an SQL parser 300, which parses the SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calculation engine 214 implements the various SQL script and planning operations, and includes a calc engine optimizer 310, which optimizes the operations, and a calc engine executor 312, which executes the operations, as well as an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (User mode) 326.

Figure 4:
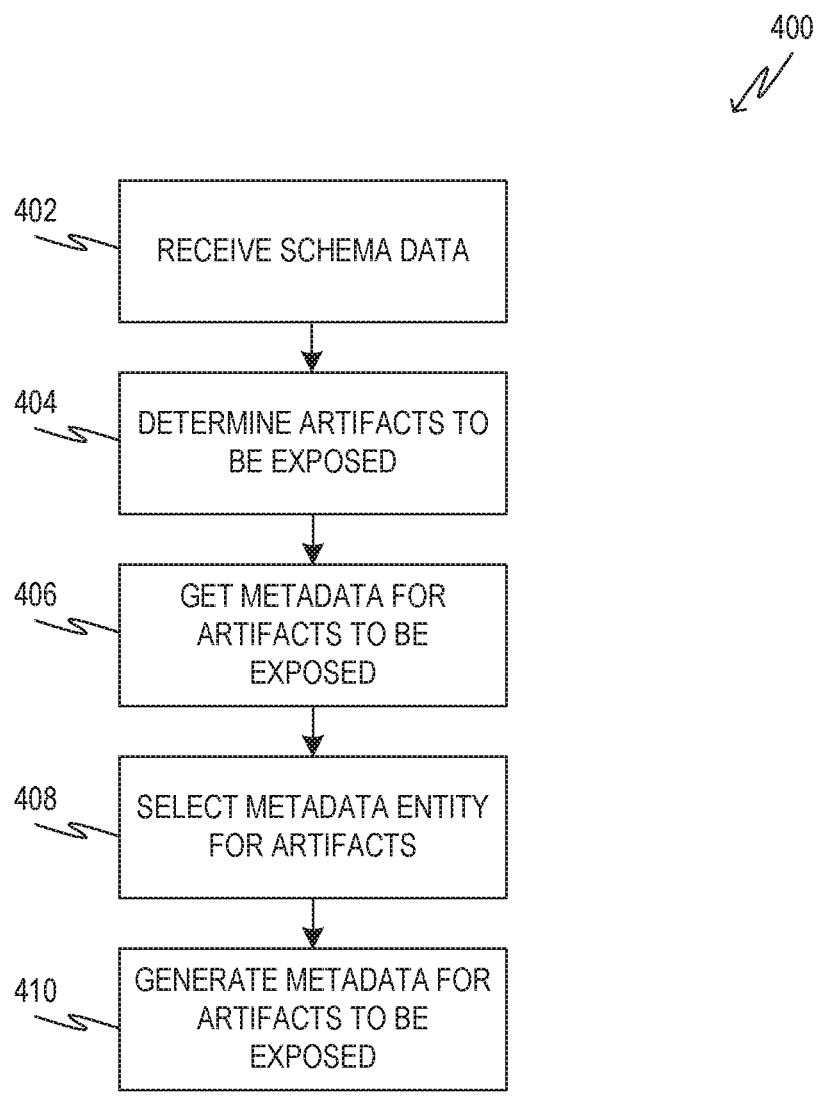
FIG. 4 is a flowchart showing one example of a process flow that may be executed by the database management system to generate the data model.

FIG. 4 is a flowchart showing one example of a process flow 400 that may be executed, for example, by a runtime executing at an application server to generate the data model for exposing database artifacts. At operation 402, the rules engine may receive schema data describing a database schema administered by the database management system 100. Schema data may describe database artifacts including, for example, one or more tables, one or more views, one or more procedures, and/or one or more functions. The schema data may be received from any suitable source.

At operation 404, the rules engine may receive data describing database artifacts received at operation 402 that are to be incorporated into the data model. For example, the data model may include translation artifacts only for database artifacts that are to be exposed to the client applications via the mapping service. Database artifacts to be exposed may be selected in any suitable manner. In some examples, the database schema may include data describing which artifacts are to be exposed via the mapping service. In some examples, the rules engine may receive an indication of the database artifacts to be exposed from an administrative user. In some examples, the rules engine may receive an indication of the database artifacts to be exposed from another system in communication with the database management system 100. In some examples, some or all of the database artifacts that are not exposed via the mapping service are nonetheless accessible, for example, via the index server 106, as described herein.

At operation 406, the rules engine may get metadata describing the database artifacts to be exposed. The type of metadata may depend on the database artifact. For example, for each database artifact, the rules engine may get a database artifact type. Example database artifact types include tables, views, procedures, functions, etc. The rules engine may get additional metadata describing the database artifact, for example, based on the artifact type. For example, the rules engine may determine whether database artifacts take input parameters and, if so, what the input parameters are. Similarly, the rules engine may determine whether the database artifacts to be exposed provide any output parameters and, if so, what the output parameters are. For some database artifacts, the rules engine may get artifact type-specific metadata. For example, for a database artifact that is a table, the rules engine may determine whether there are any foreign key relationships. For example, foreign key relationships may be considered when generating a translation artifact for the artifact. Also, for example, if a database artifact is a procedure, the rules engine may determine whether the procedure is read-only or read-write.

At operation 408, the rules engine may select a translation artifact for the database artifacts to be exposed. Translation artifacts may be selected according to the protocol used to generate the data model. For example, versions of OData, including OData V4, provide translation artifacts including, for example, function import, action import, etc. As described in more detail below, the type of translation artifact used to expose a particular database artifact may be selected to model the structure of the database artifact.

At operation 410, the rules engine may generate translation artifacts for the database artifacts to be exposed. Additional details for creating translation artifacts for different types of database artifacts are provided herein, for example, below. In the process flow 400, operations 406, 408, and 410 are described as being performed for all database artifacts that are to be exposed. In some examples, operations 406, 408, and 410 may be individually performed for each database artifact to be exposed. For example, the rules engine may perform operations 406, 408, and 410 with respect to one database artifact to be exposed, then perform operations 406, 408, and 410 with respect to a next database artifact to be exposed, and so on, until all database artifacts to be exposed have been processed. Also, in some examples, all or part of operations 406, 408, and 410 may be incorporated into processes for generating translation artifacts for database artifacts, for example, as described herein with respect to FIGS. 5-11.

Figure 5:
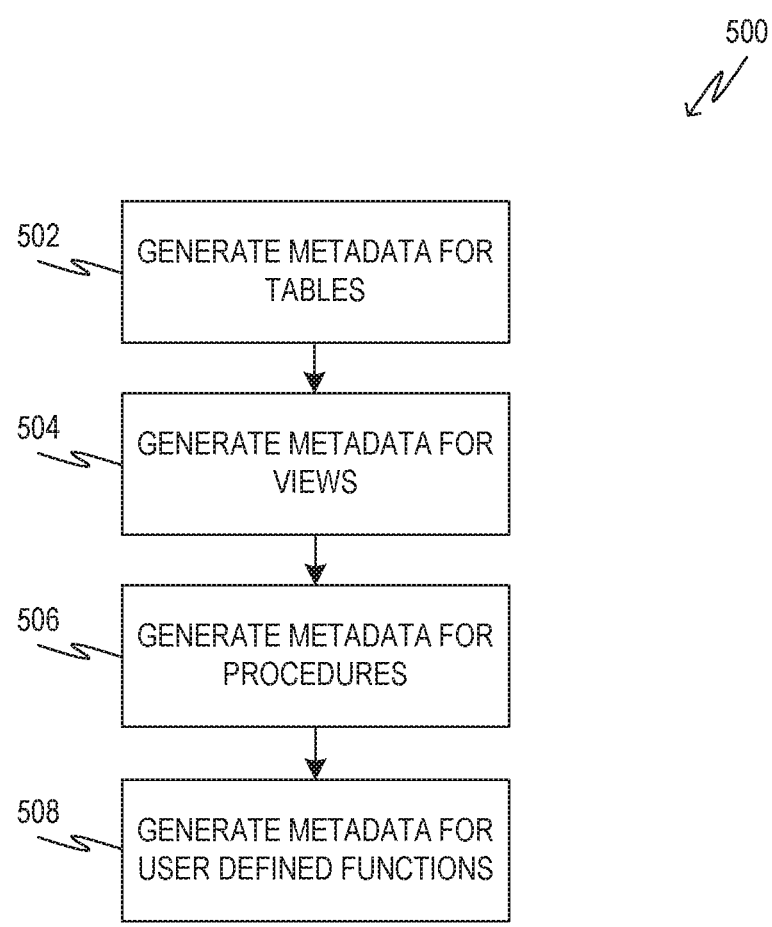
FIG. 5 is a flowchart showing one example of a process flow that may be executed to generate translation artifacts for database artifacts to be exposed.

FIG. 5 is a flowchart showing one example of a process flow 500 that may be executed to generate translation artifacts for database artifacts to be exposed. In some examples, the process flow 500 is executed by a rules engine of a mapping service. The process flow 500 shows an example in which translation artifacts are created for database artifacts according to database artifact type. For example, at operation 502, the rules engine may generate translation artifacts for tables (e.g., table-type database artifacts) that are to be exposed. Additional details describing examples for generating translation artifacts for tables are provided herein, for example, at FIG. 6. At operation 504, the rules engine may generate translation artifacts for views (e.g., view-type database artifacts). Additional details describing examples for generating translation artifacts for views are provided herein, for example, at FIGS. 7-8. At operation 506, the rules engine may generate translation artifacts for procedures (e.g., procedure-type database artifacts). Additional details describing examples for generating translation artifacts for procedures are provided herein, for example, at FIGS. 9-10. At operation 508, the rules engine may generate translation artifacts for functions, such as user-defined functions. Additional details describing examples for generating translation artifacts for functions are provided herein, for example, at FIG. 11. In some examples, translation artifacts may expose security constraints of the underlying database artifacts. A security constraint may be a limitation on who, when, or how the database artifact can be executed. For example, if a database object is read-only, or requires a particular user to execute, this may be indicated by the translation artifacts and may be enforced by the mapping service.

Figure 6:
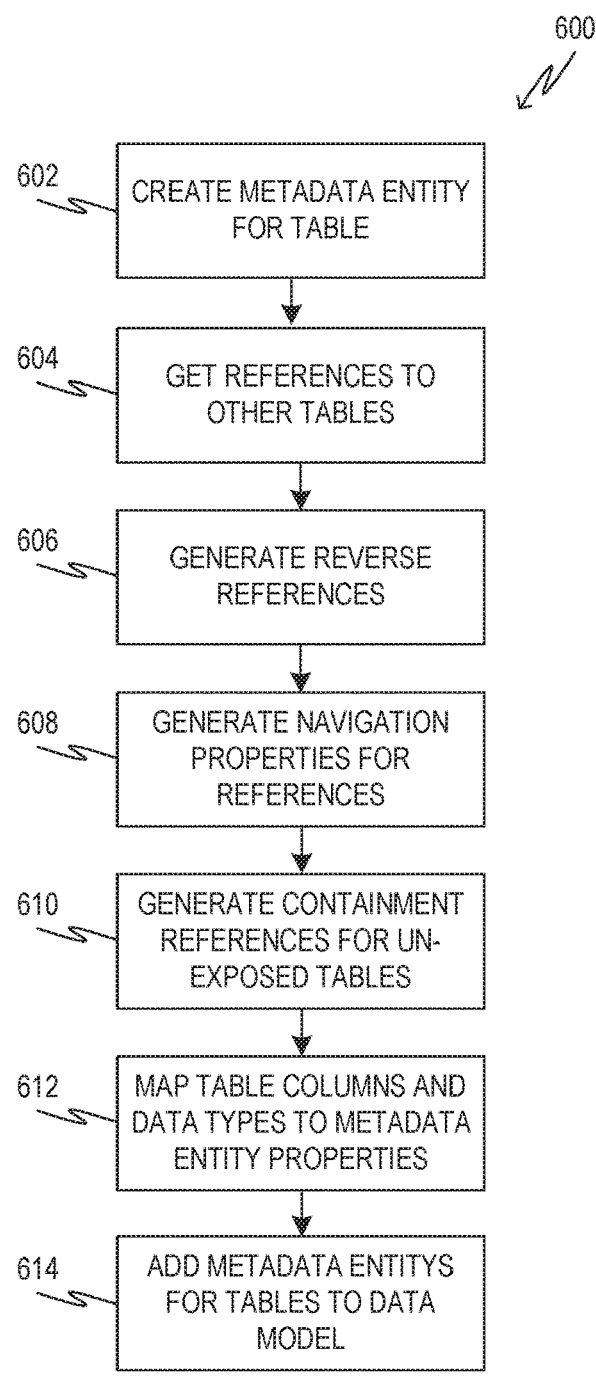
FIG. 6 is a flowchart showing one example of a process flow that may be executed to generate translation artifacts for tables to be exposed.

FIG. 6 is a flowchart showing one example of a process flow 600 that may be executed to generate translation artifacts for tables to be exposed. For example, the process flow 600 may be executed by a rules engine of a mapping service. The process flow 600 is described herein as being executed on all of the tables to be exposed in parallel. In some examples, however, the process flow 600 may be executed serially or in parallel for smaller groups of tables selected from the tables to be exposed. At operation 602, the rules engine may generate translation artifacts for the tables to be exposed. In some examples, the rules engine generates one unique table translation artifact for each table to be exposed. The name of the table translation artifact for a table may be the same as the name of the table.

The rules engine may map columns from the tables to be exposed to the translation entities generated for the tables. For example, the rules engine may add to the table translation entity a set of properties. Each property may correspond to a column from the table. For columns referencing another table (e.g., columns including a foreign key) or columns referenced by another table (e.g., by a foreign key at the other table), the rules engine may utilize navigation properties that point to or otherwise reference another table translation artifact (e.g., corresponding to a referenced or referencing table). For example, a navigation property may include reference data that describes the table translation artifact of the referenced table. In the example of FIG. 6, the rules engine first adds navigation properties to the translation artifacts generated at operation 602 and then adds properties for columns that do not reference and are not referenced by a foreign key. In some examples, however, the order of operations may be modified.

In the example of FIG. 6, the rules engine may, at operation 604, get the names of columns including foreign keys (e.g., references to other tables). An example query for obtaining the names of columns including foreign keys is below:

---
SELECT COLUMN_NAME, REFERENCED_COLUMN_NAME, REFERENCED_TABLE_NAME FROM
"SYS"."REFERENTIAL_CONSTRAINTS"
WHERE TABLE_NAME = '<tableName>' AND SCHEMA_NAME = '<schemaName>'

---

This query may return the name of a foreign key, the name of the table referenced by the foreign key (the referenced table), and a name of a column of the referenced table indicated by the foreign key (the referenced column). Each foreign key may represent a forward reference from the table including the foreign key to the referenced table. In some examples, the query above may be made for each table to be exposed.

At operation 606, the rules engine may generate reverse reference data for the tables to be exposed. Reverse reference data for a first table may indicate other tables that refer to the first table (e.g., the first table is a referenced table for another table). To illustrate forward and reverse references, consider an example with four tables to be exposed, named Product, Category, Supplier and HeadOffice. In the example, the table Product has a foreign key column called CategoryID that references a column at table Category. The table Product also has a foreign key column SupplierID that references a column at the table Supplier. The table Supplier may also have a foreign key column called HeadOfficeId that references a column at the table HeadOffice. Forward references from this example are shown by the data structure of TABLE 1 below:

TABLE 1

| Category  | → |          |          |
|-----------|---|----------|----------|
| Product   | → | Category | Supplier |
| HeadOffice| → |          |          |
| Supplier  | → | HeadOffice |        |

TABLE 2 below shows an example of the data structure of TABLE 1 with reverse references added. For example, the reverse references in TABLE 2 are bolded and underlined:

TABLE 2

| Category  | → | Product  |          |            |
|-----------|---|--------------|----------|------------|
| Product   | → | Category     | Supplier |            |
| HeadOffice| → | Supplier |          |            |
| Supplier  | → | HeadOffice   | Product |         |

At operation 608, the rules engine may generate navigation properties for the forward references and the reverse references. A navigation property may be a property of a table translation artifact for a table that refers to the table translation artifact of another table. For example, when the translation artifacts are OData artifacts, navigation properties may be OData navigation properties. Referring to the example of TABLE 2 above, the rules engine may generate a navigation property called Product for the table translation artifact for the table Category. The rules engine may generate a navigation property called Category and a navigation property called Supplier for the table translation artifact for the table Product. The rules engine may generate a navigation property called Supplier for the table translation artifact for the table HeadOffice. The rules engine may generate a navigation property called HeadOffice and a navigation properly called Product for the table translation artifact for the table Supplier.

In some examples, a navigation property for a table translation artifact may be a collection-type navigation property or a single-type navigation property. A collection-type navigation property may include reference data that refers to multiple other tables while a single-type navigation property may refer to a single other table. In some examples, forward references may be represented by single-type navigation properties while some reverse references may be represented by collection-type navigation properties. For example, in a forward reference, the column including the foreign key may refer to only one other table (e.g., the table referenced by the foreign key). On the other hand, in a reverse reference, multiple tables can reference a single table. Accordingly, a reverse reference, in some examples, can be a collection-type navigation property referencing multiple other tables (e.g., multiple tables that reference the table or a column of the table corresponding to the table translation artifact including the collection-type navigation property).

In some examples, the rules engine, when configuring a navigation property, may determine whether the table referred to by the navigation property is to be exposed by the mapping service 18A, 18B. If not, the navigation property may be configured with a containment relationship at operation 610. According to a containment reference, the rules engine may generate a table translation artifact for the referenced table, but may configure the table translation artifact for the referenced table so that it can be accessed only via the navigation property of the referencing table's table translation artifact. In some examples, instead of generating a separate table translation artifact for the referenced table, the rules engine may incorporate the relevant column or columns of the referenced table into the table translation artifact of the referencing table or tables. For example, consider two tables, table A and table B. Table A references table B hut table B is not to be exposed. In this example, the navigation property for the forward reference between table A and table B may include a containment reference. In this way, table B may be "contained" within table A, meaning that the portion of table B referenced by table A can be referenced through table A, but that table B cannot be referenced on its own.

At operation 612, the rules engine may map columns and data types from tables to the corresponding translation artifacts. For example, the rules engine may receive column name data describing the names of columns in the tables. In some examples, columns including or referenced by foreign keys may have been represented as navigation properties at operation 608. Other columns may be mapped at operation 612. In some examples, the rules engine may fetch column information for a table utilizing the following query:

---
SELECT COLUMN_NAME,DATA_TYPE_NAME, FROM
TABLE_COLUMNS WHERE
TABLE_NAME = '<tableName>' AND SCHEMA_NAME = '<schemaName>'
ORDER BY POSITION The rules engine may fetch keys or composite keys of the table with the following query:

```
SELECT COLUMN_NAME FROM "SYS"."CONSTRAINTS" WHERE
TABLE_NAME = '<tableName>' AND SCHEMA_NAME =
'<schemaName>'
WHERE IS_PRIMARY_KEY = 'TRUE'
```

At operation 614, the rules engine may add the translation artifacts for exposed tables to the data model.

As described herein, table translation artifact properties may be assigned data types that are equivalent to the data types from the corresponding table columns. To illustrate, TABLE 3, shown below, is an example table called PRODUCTS:

TABLE 3

"PRODUCTS"

| Key | Product Name | Units in Stock | Price/Unit |
|---|---|---|---|
| 1 | Tissue Rolls | 500 | 0.50 |
| 2 | Tissue Dispensers | 50 | 20.50 |
| 3 | Mop | 100 | 12.20 |

In the table PRODUCTS, a column called "Key" includes primary keys for the rows of the table, which may be represented as an integer data type. A column called "Product Name" includes text strings. A column called "Units in Stock" includes integers and a column called "Price/Unit" includes floating point data.

In some examples, the database schema and the translation artifacts may not utilize the same data types. In these examples, the rules engine may be configured to translate data types from the syntax of the database schema to the syntax of the translation artifacts. Different data syntaxes can express data types in different ways, however. To illustrate an example, TABLE 4 below shows an example mapping of data types from data types used by the HANA system from SAP AG of Walldorf, Germany and data types of OData V4.

TABLE 4

| HANA Type | OData V4 Type |
|---|---|
| VARCHAR, NVARCHAR, ALPHANUM | Edm.String |
| TINYINT, SMALLINT | Edm.Byte, Edm.Int16 |
| INTEGER | Edm.Int32 |
| BIGINT | Edm.Int64 |
| DEC(p, s) | Edm.Decimal |
| DECIMAL, SMALLDECIMAL | Edm.Double, Edm.Single respectively |
| DOUBLE | Edm.Double |
| LOB Types | Edm.Binary |
| DATE, TIME, SECONDDATE, TIMESTAMP | Edm.Date, Edm.TimeOfDay, Edm.DateTimeOffset |

Figure 7:
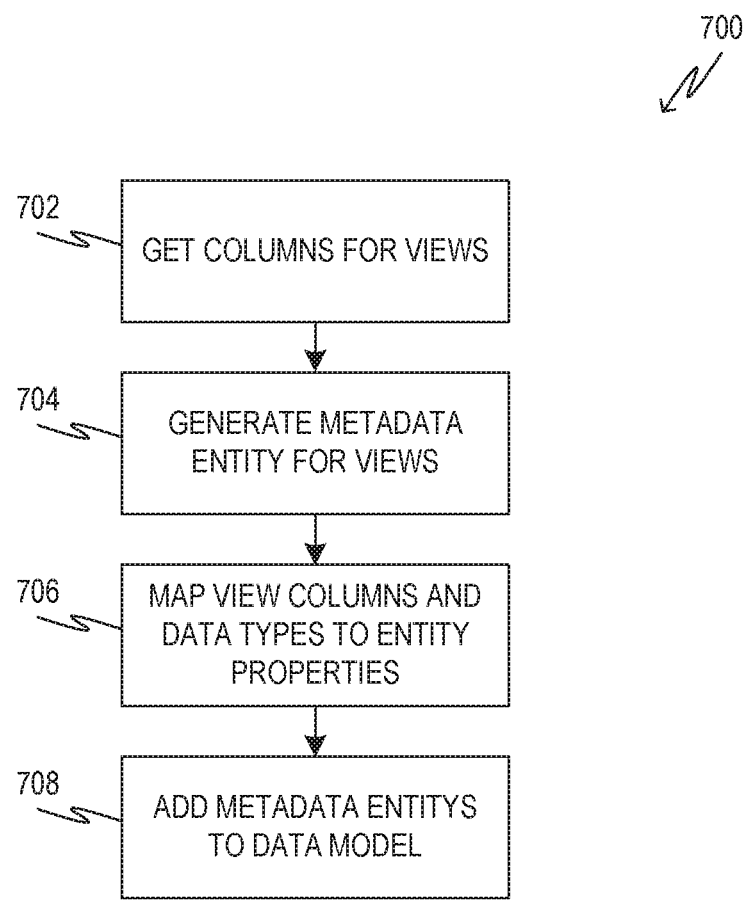
FIG. 7 is a flowchart showing one example of a process flow that may be to generate translation artifacts for attribute views to be exposed.

FIG. 7 is a flowchart showing one example of a process flow 700 that may be to generate translation artifacts for attribute views to be exposed. For example, the process flow 700 may be executed by a rules engine of a mapping service. Attribute views may be artifacts of the database schema that are generated by joining all or parts of multiple tables. For example, views may be similar to tables, but may lack a primary key. A result (e.g., view result) of an attribute view may be columns indicated by the attribute view. Accordingly, the rules engine may generate translation artifacts for attribute views in a manner similar to that described with respect to the process flow 600 for tables. The process flow 700 is described as being performed on a single attribute view. For example, the process flow 700 may be performed serially on different attribute views to be exposed. Also, in some examples, the process flow 700 may be performed in parallel on some or all of the attribute views to be exposed.

At operation 702, the rules engine may get the columns included in an attribute view. For example, the rules engine may execute the query indicated below:

```
SELECT COLUMN_NAME,DATA_TYPE_NAME FROM
VIEW_COLUMNS
WHERE VIEW_NAME = (given view name) ORDER BY POSITION
```

The rules engine may receive view column data describing the columns included in the attribute view. At operation 704, the rules engine may generate a view translation artifact for the attribute view. At operation 706, the rules engine may map the columns of the view attribute to the view translation artifact. Mapping the columns of an attribute view to its associated view translation artifact may be performed in a manner similar to that described with respect to FIG. 6 for mapping columns of a table to the associated table translation artifact of the table. For example, the rules engine may create navigation properties for columns that are the subject of forward or reverse references. In some examples, an attribute view, unlike a table, may not be writable. Accordingly, the rules engine may configure a view translation artifact for an attribute view such that it cannot be written to (e.g., created, updated, and/or deleted). At operation 708, the rules engine may add the view translation artifacts for attribute views to the data model.

Figure 8:
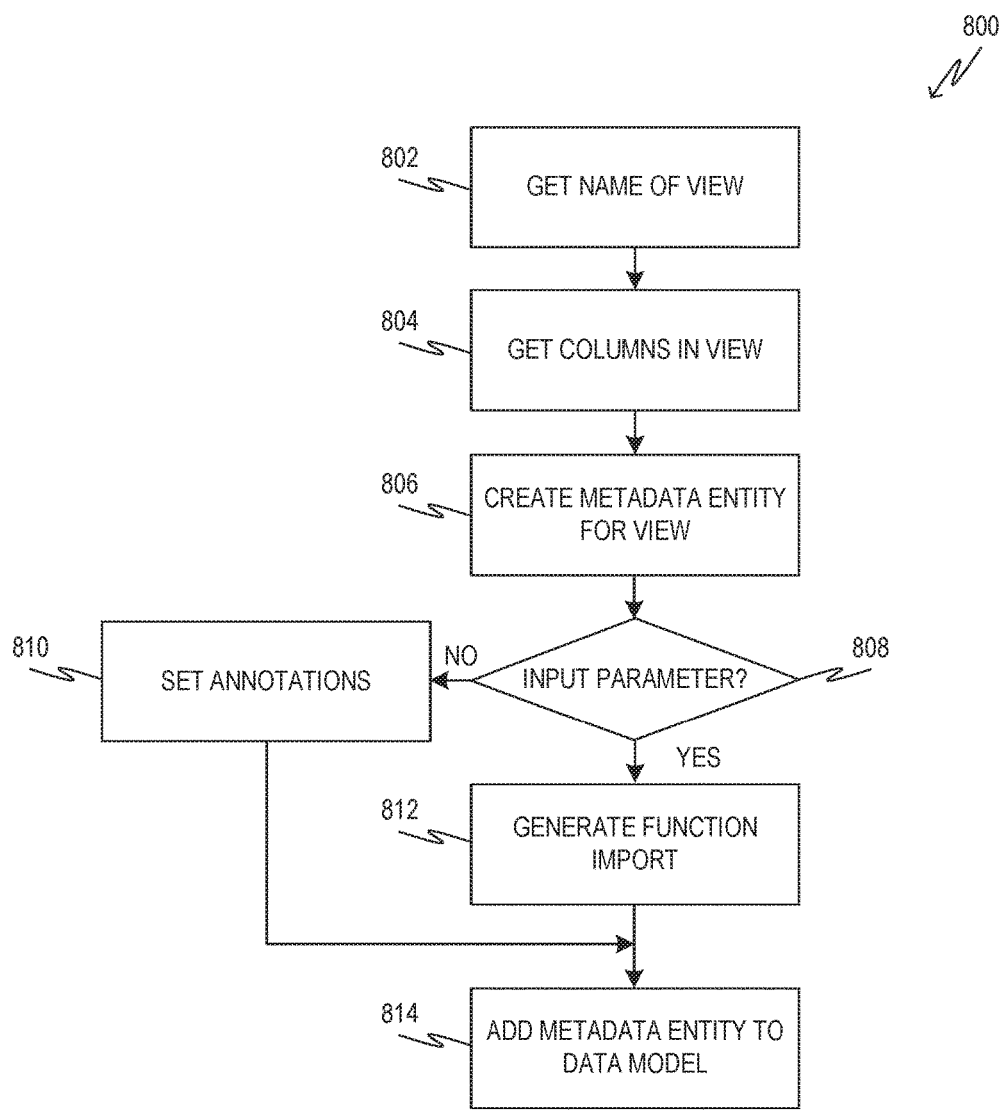
FIG. 8 is a flowchart showing one example of a process flow that may be executed to create translation artifacts for analytic views and/or calculation views to be exposed.

FIG. 8 is a flowchart showing one example of a process flow 800 that may be executed to create translation artifacts for analytic views and/or calculation views to be exposed. For example, the process flow 800 may be executed by a rules engine of a mapping service. Analytic views may be database artifacts of the database schema that are used for calculation and aggregation. For example, analytic views may add transactional tables to the database schema, calculate aggregate, and/or join attribute views. Calculation views may be artifacts of the database schema that are composite views used to combine other views. For example, calculation views may take as input other analytical, attribute, or other calculation views as well as tables and provide as output (e.g., a view output) a column or columns indicated by the attribute view. In some examples, a calculation view may perform calculations on its input. The process flow 800 is described as being executed on a single view. For example, the process flow 800 may be executed sequentially or in parallel on analytic and/or calculation views to be exposed.

At operation 802, the rules engine may get the name of a view to be exposed. At operation 804, the rules engine may get the columns of the view. For example, the rules engine may run the following query on a central table of the database schema:

```
SELECT COLUMN_NAME,CS_DATA_TYPE_NAME FROM
VIEW_COLUMNS
WHERE VIEW_NAME = (given view name) ORDER BY POSITION
```

When the database schema is from the HANA database management system, the query may be run on a central table called VIEW_COLUMNS. They query may provide view column data describing the names of the columns in the view and, in some examples, may also provide the data types associated with the columns. At operation 806, the rules engine may generate a view translation artifact for the view. The view translation artifact may have properties corresponding to each of the columns of the view, with data types corresponding to the data types of the columns of the view.

At operation 808, the rules engine may determine whether the view takes an input parameter. In some examples utilizing the HANA database management system, the rules engine may make this determination by querying the central table BIMC_VARIABLE_ASSIGNMENT with the view name as the parameter, for example, as given below:

```
SELECT VARIABLE_NAME FROM
"_SYS_BI"."BIMC_VARIABLE_ASSIGNMENT" WHERE
CUBE_NAME =
(given view name) AND CATALOG_NAME = catalog name AND
PLACEHOLDER_NAME LIKE '$$%$$'
```

This may return the names of the input variables (if any) used by the view. In some examples, the BIMC_VARIABLE_ASSIGNMENT table may indicate all variables used by the view including input parameters (expected to be received from the user at run-time) and internal variables. The condition PLACEHOLDER_NAME LIKE '$$%$$' may limit the results to input parameters. An example of the above query for a view called SALESREPORT is given below:

```
SELECT
    "REGION_NAME",
    "NET_AMOUNT",
    sum("PRODUCT_ID") AS "PRODUCT_ID",
    sum("SALES_AMOUNT") AS "SALES_AMOUNT",
FROM "SCHEMA"."VIEWS/SALESREPORT" ('PLACEHOLDER' =
('$$DISCOUNT$$',
    '<Enter Value>'))
GROUP BY
    "REGION_NAME",
    "NET_AMOUNT"
```

Here, the string $$DISCOUNT$$ indicates that the input parameter DISCOUNT is received from the user at runtime.

If, at operation 808, the rules engine determines that the view takes at least one input parameter, it may add a function import to the view translation artifact at operation 812. A type of the function import may be equivalent to the type of the input parameter or parameters. In some examples, the rules engine may determine a data type of the input parameters or parameters. For example, when implemented in a HANA database management system, the rules engine may query the BIMC_VARIABLE table to obtain the data type of the variable. An example query for doing so is below:

```
"SELECT COLUMN_SQL_TYPE FROM
"_SYS_BI"."BIMC_VARIABLE"
WHERE "CUBE_NAME" = (given view name) AND
"CATALOG_NAME" = (given catalog name) AND
"VARIABLE_NAME" = (obtained variable name)"
```

In some examples, the rules engine also generates a function (e.g., an unbound function) that is imported by the function import. The function may have a return type that is equivalent to the table translation artifact type created for the view at operation 806. In some examples, the function may also be marked in a manner that makes it callable only by the function import. For example, when the database management system is a HANA database management system, the rules engine may set an IncludeInServiceDocument flag for the function as false. This may prevent a user from accessing the function outside the context of the function import. An example statement of a function that may be generated for a calculation view called "GetNearestAirport" is below:

```
<Function Name="GetNearestAirport"
    IsComposable="true">
<Parameter Name="lat" Type="Edm.Do
uble" Nullable="false"/>
<Parameter Name="lon" Type="Edm.Do
uble" Nullable="false"/>
<ReturnType
Type="Collection(Micro
soft.OData.SampleService.Models.Tr
ipPin.Airport)" Nullable="false"/>
</Function>
<FunctionImport Name="GetNearestA
irport" Function="Microsoft.OData.S
ampleService.Models.TripPin.GetNea
restAirport>
</FunctionImport>
```

The statement above is XML formatted according to the OData CSDL schema, although any suitable protocol, schema, or syntax may be used.

If at operation 808, the rules engine determines that the view does not receive input parameters, then the mapping service 118 may use the table translation artifact directly to query the analytic or calculation view (e.g., the table translation artifact may not include a function import). Accordingly, if the rules engine determines that the view does not receive input parameters, it may, at operation 810, annotate the table translation artifact for the view with data indicating that the table translation artifact may be used only for a query operation. At operation 814, the rules engine may add the translation artifact constructed for the view to the data model.

Figure 9:
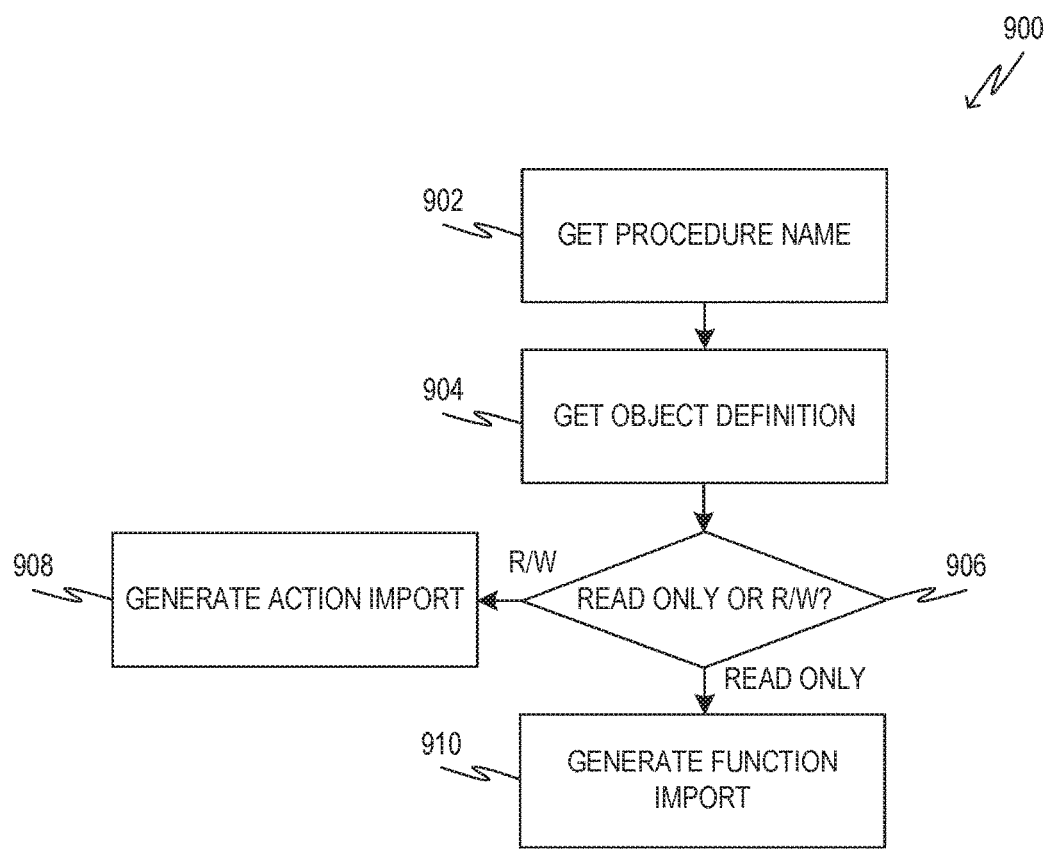
FIG. 9 is a flowchart showing one example of a process flow that may be executed to expose a procedure.

FIG. 9 is a flowchart showing one example of a process flow 900 that may be executed to expose a procedure. For example, the process flow 900 may be executed by a rules engine of a mapping service, such as mapping services 18A, 18B (FIG. 1A). A procedure may be an database artifact of the database schema that performs a particular task. For example, procedures may include reusable processing blocks that describe a sequence of data transformations to be performed on data stored according to the database schema (e.g., in a table). Procedures may have input parameters and/or output parameters. Also, in some examples, procedures can be read-only or read-write. In some examples, procedures may also be modified. For example, in the HANA database management system, a procedure may be modified utilizing a DROP statement and/or a CREATE statement to modify the procedure's object definition. A result of a procedure (e.g., a procedure result) may including one or more columns from the database schema and/or a modification to the database schema.

At operation 902, the rules engine may receive the name of a procedure for which a procedure translation artifact is to be generated. The process flow 900 describes operations on a single procedure of the database schema however, in some examples, the mapping service 18A, 18B may execute the process flow 900 on multiple procedures simultaneously. For example, at operation 902, the rules engine may receive the names of multiple procedures and act on them simultaneously.

At operation 904, the rules engine may obtain an object definition for the procedure indicated at operation 902. An example query for obtaining the object definition is provided below:

```
CALL
"SYS"."GET_OBJECT_DEFINITION"('_SYS_BIC','<schemaName>/<pro
cedureName>')
```

In some examples, the object definition may include information about the procedure including, for example, a type of the procedure, an identification or ID of the procedure, and/or an object creation statement. An object creation statement may be a statement (for example, according to the data definition language or DDL syntax) that is used to create the procedure. At operation 906, the rules engine may determine whether the procedure is read-only or read-write. For example, the rules engine may examine whether the object definition and/or object creation statement includes an indication that the procedure reads SQL data. If the indication is present, the procedure is read-only. If the indication is not present, the procedure is read-write.

If the procedure is read-only, the rules engine may generate a function import for the procedure at operation 910. The function import may take an import parameter or parameters and return a scalar, an entity type, a complex type, a combination thereof, etc. The rules engine may assign input and output parameters of a procedure, for example, by referring to the object creation statement or other similar record for the procedure. If the procedure is read-write, the rules engine may generate an action import for the procedure at operation 908. For example, an action import may allow side effects such as data modification. Also, in some examples, an action import may not be further composed (e.g., to avoid non-deterministic behavior).

Figure 10:
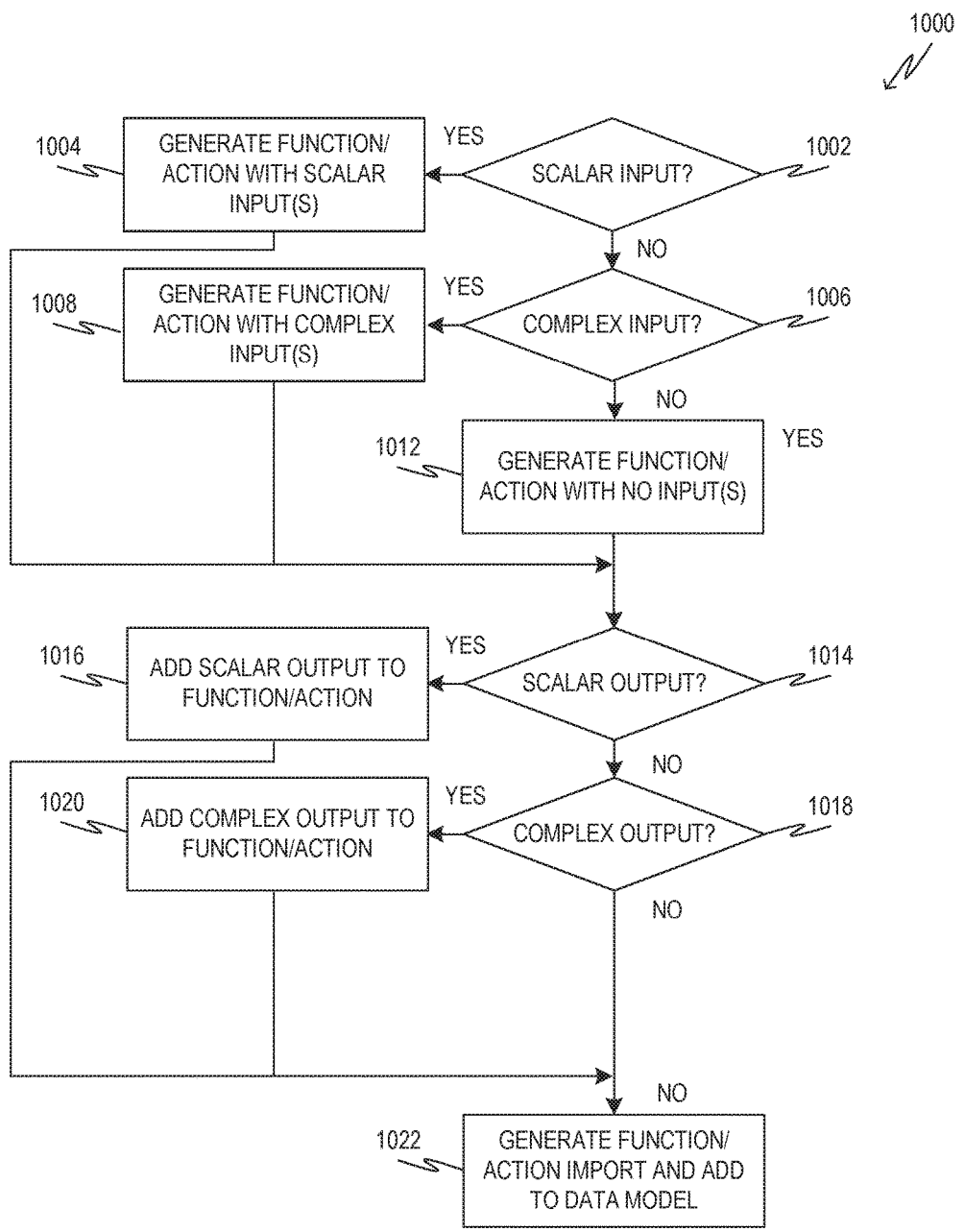
FIG. 10 is a flowchart showing one example of a process flow that may be executed to generate a function import and/or an action import for a procedure to be exposed.

FIG. 10 is a flowchart showing one example of a process flow 1000 that may be executed to generate a function import and/or an action import for a procedure to be exposed. For example, the process flow 1000 may be executed by a rules engine of a mapping service. The process flow 1000 may be executed by the rules engine on a single procedure or in parallel on multiple procedures. The process flow 1000 provides an example of how the operations 908 and 910) from the process flow 900 may be executed.

At operation 1002, the rules engine may determine whether the procedure takes a scalar input parameter. For example, the rules engine may refer to an object creation statement or similar data structure for the procedure to determine whether it takes a scalar input. In some examples, the rules engine may determine whether the procedure takes a scalar input parameter by determining whether the object creation statement indicates a complex input such as a table. If yes, then the rules engine may conclude that the procedure does not take a scalar as an input parameter. If no, then the rules engine may conclude that the procedure does take a scalar as an input parameter. In some examples where the database management system is a HANA database management system, the rules engine may determine whether the object creation statement for the procedure contains 'IN INPUT_TABLE,' indicating that it takes a table as an input parameter.

If the procedure does take a scalar input, the rules engine may, at operation 1004, generate an action (or function) with the same name as that of the procedure and a scalar input parameter (e.g., having a same type as the scalar input parameter for the procedure). The rules engine may then proceed to operation 1014, described below, to set output properties of the function and/or action.

If the procedure does not take a scalar input, the rules engine may determine at operation 1006 whether the procedure takes a complex input such as a table. For example, the rules engine may determine whether the procedure takes a complex input by inspecting the object creation statement for the procedure, for example, as described above. If yes, the rules engine may generate, at operation 1008, a function or action having a complex input matching the input of the procedure. The rules engine may get metadata for the table or other complex input, for example, utilizing the example query below:

```
SELECT COLUMN_NAME,DATA_TYPE_NAME FROM
TABLE_COLUMNS WHERE
TABLE_NAME = 'tabletypeName' AND SCHEMA_NAME =
'schemaName'
ORDER BY POSITION
```

The returned metadata may be incorporated into the created action. The rules engine may then proceed to operation 1014. If the procedure takes neither a scalar nor a complex input, the rules engine may, at operation 1012 generate a function and/or action with no inputs.

At operation 1014, the rules engine may determine whether the procedure provides a scalar output. This, in some examples, is also accomplished by referring to the object creation statement for the procedure. For example, when the database management system is a HANA database management system, the object creation statement may not contain OUT OUTPUT_TABLE if the procedure provides a scalar output. If the object creation statement indicates that the procedure does provide a scalar output, then the rules engine may, at operation 1016, add a scalar output (e.g., ReturnType) to the action or function for the procedure. The scalar output for the function or action may have a name and type matching the name and type of the scalar output of the procedure, for example, as indicated by the object creation statement. If there are multiple scalar outputs, the rules engine may create for the function or action a complex type output having all of the individual scalar output parameters as properties.

If there is no scalar output, the rules engine may, at operation 1018, determine whether the procedure has a complex output (e.g., a table). If so, the rules engine may, at operation 1020, add a complex output to the function and/or action for the procedure. For example, the rules engine may get metadata describing the complex output parameter using the following query:

```
SELECT COLUMN_NAME,DATA_TYPE_NAME FROM
TABLE_COLUMNS WHERE
TABLE_NAME = 'tabletypeName' AND SCHEMA_NAME =
'schemaName'
ORDER BY POSITION
```

In some examples, if a table has multiple table types as output parameters, it may create multiple instances of complex output types at the action and/or function. If there is no complex output, the rules engine may proceed to operation 1022. At operation 1022, the rules engine may generate an action import or function import translation artifact for the action or function generated at the process flow 1000 and may add the generated translation artifact or artifacts to the data model.

Figure 11:
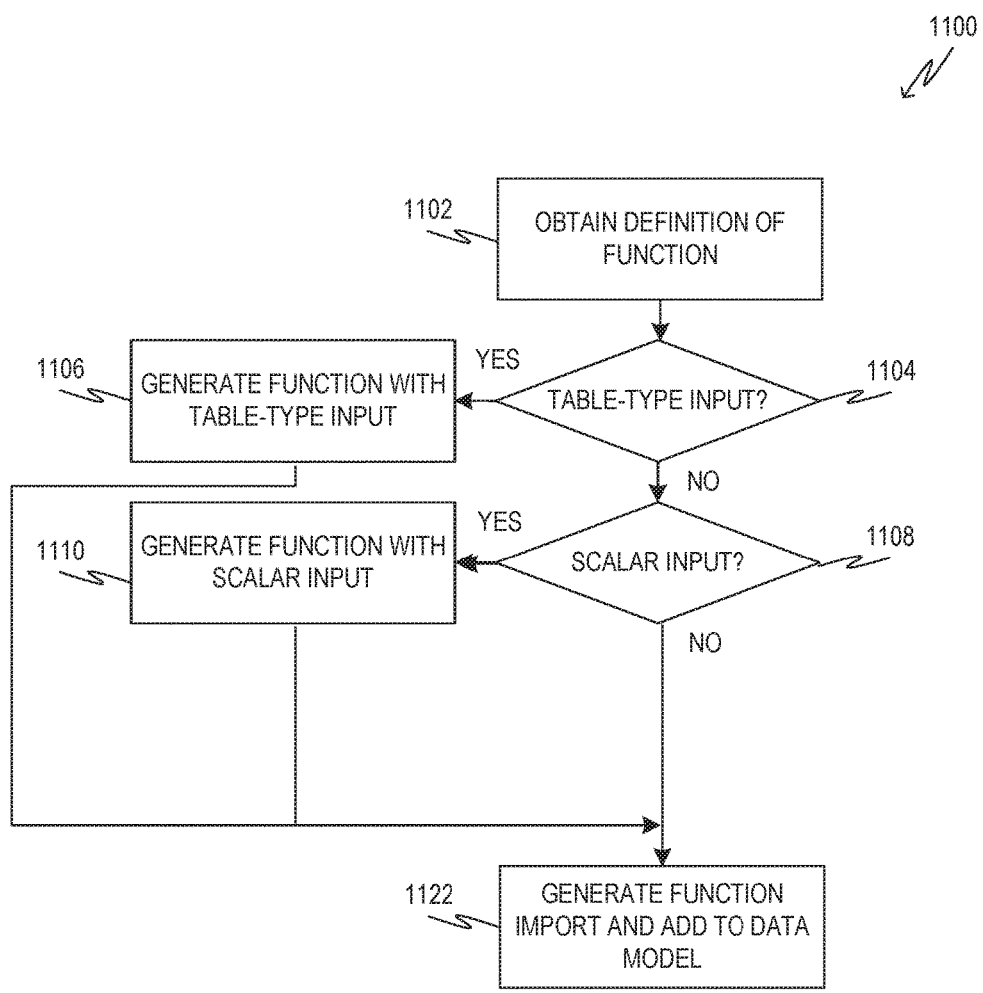
FIG. 11 is a flowchart showing one example of a process flow that may be executed by the database management system to expose a function from the database schema via the mapping service.

FIG. 11 is a flowchart showing one example of a process flow 1100 that may be executed to expose a function from the database schema via the mapping service 18A, 18B. The process flow 1100 may be executed, in some examples, by a rules engine of a mapping service. A function of the database schema may be an artifact that includes logic (e.g., complex logic) that may be invoked with SQL statements. In some examples, database schema functions may be user-defined. Also, in some examples, database schema functions may be read-only. In some examples, database schema functions may accept one or more input parameters and return a single table type or list of scalar values. A scalar database schema function may return a scalar value while a table database schema function may return a table type. The process flow 1100 describes operations performed with respect to a single database schema function. In some examples, however, the process flow 1100 may be executed in parallel on multiple database schema functions.

At operation 1102, the rules engine may obtain a definition of a database schema function. For example, the rules engine may utilize the query below to obtain an object definition for a database schema function:

```
CALL
"SYS"."GET_OBJECT_DEFINITION"('_SYS_BIC','<schemaName>/<fun
ctionName>')
```

A sample object definition of a database schema function, expressed in DDL, is below:

```
CREATE FUNCTION scale (val INT)
    RETURNS TABLE (a INT, b, INT) LANGUAGE SQLSCRIPT AS BEGIN
        RETURN SELECT a, :val * b AS b FROM mytab;
    END;
```

Parsing the portion of the object definition within the parentheses after the database schema function name may provide an indication of the input to the database schema function. In the example above, the database schema function "scale" receives an integer as an input (e.g., not a table type input).

At operation 1104, the rules engine may determine whether the database schema function takes a table-type input, for example, as described. If yes, the rules engine may generate a metadata function with a table-type input at operation 1106. For example, the rules engine may check the return type of the database schema function. In the example object definition above, the return time is TABLE(a INT, b INT), which indicates a table type return with fields a and h that are both integers. Accordingly, the rules engine may create a metadata function with a complex or table type return. The metadata function, inputs, and outputs may be named after the name of the database schema function to be exposed and its inputs and outputs. At operation 1108, the rules engine may determine whether the database schema function takes a scalar input. If yes, the rules engine may generate a metadata function with a scalar input at operation 1110. At operation 1122, the rules engine may generate a function import corresponding to the metadata function generated at operation 1106 or 1110 and may add the metadata function and function import to the data model.

Example Software Architecture

Figure 12:
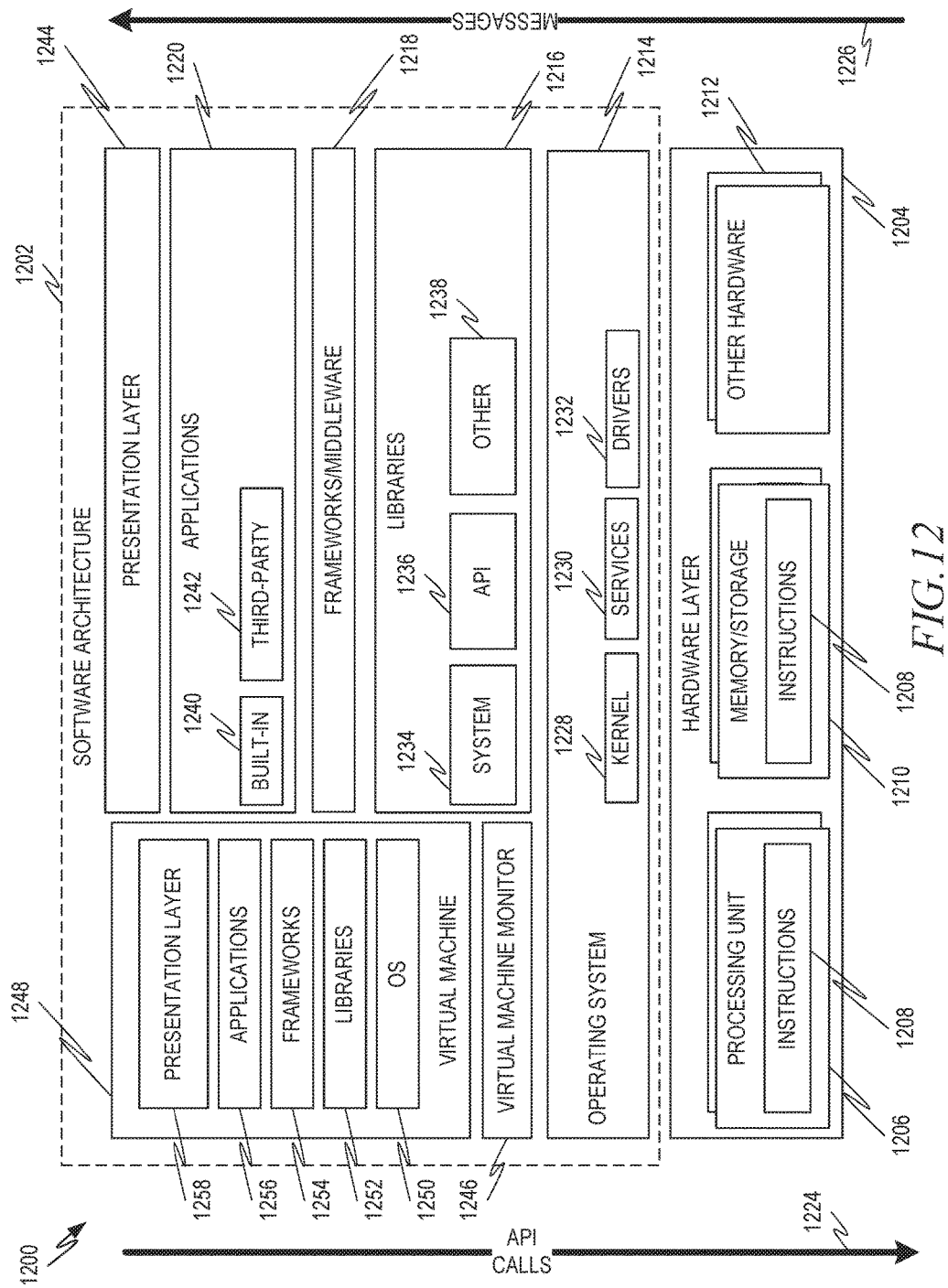
FIG. 12 is a block diagram showing one example of a software architecture for a computing device.

FIG. 12 is a block diagram 1200 showing one example of a software architecture 1202 for a computing device. The architecture 1202 may be used in conjunction with various hardware architectures, for example, as described herein. FIG. 12 is merely a non-limiting example of a software architecture and many other architectures may be implemented to facilitate the functionality described herein. A representative hardware layer 1204 is illustrated and can represent, for example, any of the above referenced computing devices. In some examples, the hardware layer 1204 may be implemented according to the architecture of the computer system 1300 of FIG. 13.

The representative hardware layer 1204 comprises one or more processing units 1206 having associated executable instructions 1208. Executable instructions 1208 represent the executable instructions of the software architecture 1202, including implementation of the methods, modules, subsystems, and components, and so forth described herein and may also include memory and/or storage modules 1210, which also have executable instructions 1208. Hardware layer 1204 may also comprise other hardware as indicated by other hardware 1212 which represents any other hardware of the hardware layer 1204, such as the other hardware illustrated as part of computer system 1300.

In the example of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220 and presentation layer 1244. Operationally, the applications 1220 and/or other components within the layers may invoke application programming interface (API) calls 1224 through the software stack and receive a response, returned values, and so forth illustrated as messages 1226 in response to the API calls 1224. The layers illustrated are representative in nature and not all software architectures have all layers. For example, some mobile or special purpose operating systems may not provide a frameworks/middleware 1218 layer, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of an interrupt and, in response, cause the architecture 1202 to pause its current processing and execute an interrupt service routine (ISR) when an interrupt is received.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers). Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications 1240 as well as a broad assortment of other applications. In a specific example, the third-party applications 1242 (e.g., an application developed using the Android™ or iOS™ software development kit (SDK) by an entity other than the vendor of the particular platform) may be mobile software running on a mobile operating system such as iOS™. Android™, Windows® Phone, or other mobile computing device operating systems. In this example, the third-party applications 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system libraries 1234, API libraries 1236, and other libraries 1238), frameworks/middleware 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware computing device. A virtual machine is hosted by a host operating system (e.g., operating system 1214) and typically, although not always, has a virtual machine monitor 1246, which manages the operation of the virtual machine 1248 as well as the interface with the host operating system (i.e., operating system 1214). A software architecture executes within the virtual machine 1248 such as an operating system 1250, libraries 1252, frameworks/middleware 1254, applications 1256 and/or presentation layer 1258. These layers of software architecture executing within the virtual machine 1248 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 13:
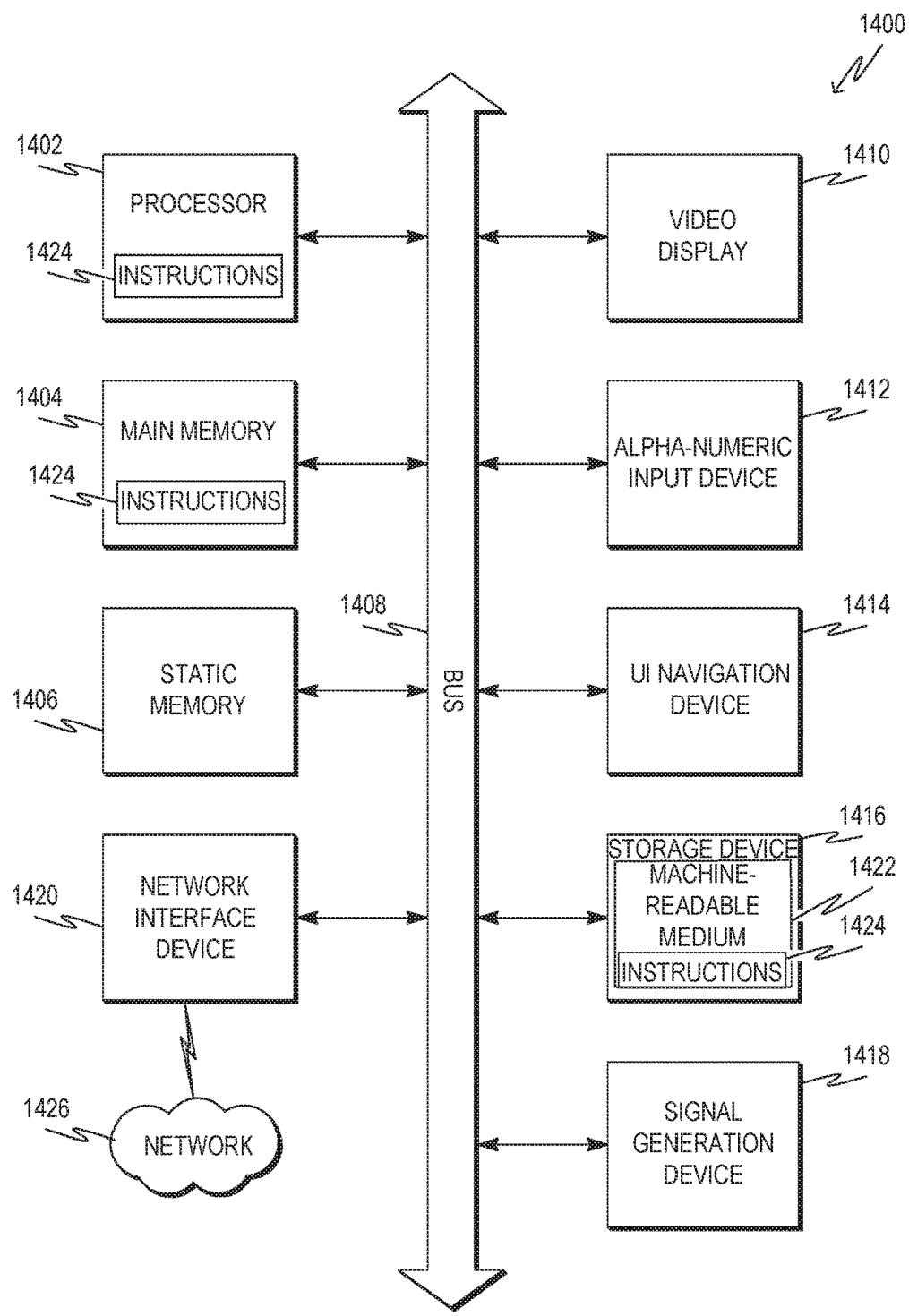
FIG. 13 is a block diagram of a machine in the example form of a computer system within which instructions may be executed for causing the machine to perform any one or more of the methodologies discussed herein.

FIG. 13 is a block diagram of a machine in the example form of a computer system 1300 within which instructions 1324 may be executed for causing the machine to perform any one or more of the methodologies discussed herein. In alternative embodiments, the machine operates as a standalone device or may be connected (e.g., networked) to other machines in a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify operations to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation (or cursor control) device 1314 (e.g., a mouse), a disk drive unit (or other storage device 1316), a signal generation device 1318 (e.g., a speaker), and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, with the main memory 1304 and the processor 1302 also constituting machine-readable media 1322.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1324 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a system, comprising: at least one processor and a memory in communication with the at least one processor, wherein the at least one processor is programmed to execute: a rules engine programmed to: receive schema data describing a database schema of an in-memory database, wherein the database schema describes a table, a view, and a procedure; and generate a data model comprising a plurality of translation artifacts, wherein a table translation artifact of the plurality of translation artifacts describes a table of the database schema, wherein a view translation artifact describes a view of the database schema, and wherein a procedure translation artifact describes a procedure of the database schema; and a mapping service programmed to: receive from a client application a first client request comprising first data describing the view translation artifact; initiate execution of the view at an in-memory database to determine a view result; and send the view result to the client application.

In Example 2, the subject matter of Example 1 optionally includes wherein the mapping service is further programmed to: receive from the client application a second client request comprising second data describing the procedure translation artifact; execute the procedure at the in-memory database to determine a procedure result; and send the procedure result to the client application.

In Example 3, the subject matter of any one or more of Examples 1-2 optionally includes wherein the rules engine is further programmed to: generate the table translation artifact for the table; receive column data for the table, wherein the column data describes a first column of the table and a first data type of the first column; and generate a first property of the table translation artifact for a first column of the table, wherein a first property data type of the first property is equivalent to the first data type of the first column.

In Example 4, the subject matter of Example 3 optionally includes wherein the rules engine is further programmed to: receive column name data comprising a name of a second column of the table that comprises a foreign key describing a referenced table; and generate a second property of the table translation artifact for the second column, wherein the second property comprises reference data describing a second table translation artifact corresponding to the referenced table.

In Example 5, the subject matter of Example 4 optionally includes wherein the rules engine is further programmed to configure the data model to permit access to the second table translation artifact only through the table translation artifact.

In Example 6, the subject matter of any one or more of Examples 3-5 optionally includes wherein the rules engine is further programmed to: generate reverse reference data describing a first referring table comprising a first foreign key column referencing a second column of the table; and generate a second property of the table translation artifact, the second property comprising reference data describing the first foreign key column of the first referring table.

In Example 7, the subject matter of Example 6 optionally includes wherein the reverse reference data also describes a second referring table comprising a second foreign key column referencing the second column of the table, and wherein the rules engine is further programmed to add second reference data to the second property, the second reference data describing the second foreign key column of the second referring table.

In Example 8, the subject matter of any one or more of Examples 1-7 optionally includes wherein the rules engine is further programmed to: receive view column data describing a plurality of columns of the view, wherein the plurality of columns comprises a first view column, and wherein the view column data also describes a first data type of the first view column; generate a view translation artifact for the view; generate a first property of the view translation artifact, wherein the first property is for a first view column; and set a first property view data type to the first data type of the first view column.

In Example 9, the subject matter of any one or more of Examples 1-8 optionally includes wherein the rules engine is further programmed to: receive view column data describing a plurality of columns of the view, wherein the plurality of columns comprises a first view column, and wherein the view column data also describes a first data type of the first view column; generate a view translation artifact for the view; determine that the view receives an input parameter; determine a type of the input parameter; generate a function import for the view translation artifact, wherein a type of the function import is equivalent to the type of the input parameter; and generate a function callable by the function import to execute the view.

In Example 10, the subject matter of any one or more of Examples 1-9 optionally includes wherein the rules engine is further programmed to: determine that the procedure is read-only; generate a procedure translation artifact for the procedure; generate a function import for the procedure translation artifact; and generate a function callable by the function import to execute the procedure, wherein the function does not modify the database schema.

In Example 11, the subject matter of any one or more of Examples 1-10 optionally includes wherein the rules engine is further programmed to: determine that the procedure is read-write; generate a procedure translation artifact for the procedure; generate an action import for the procedure translation artifact; and generate an action callable by the action import to execute the procedure, wherein the action is capable of modifying the database schema.

In Example 12, the subject matter of any one or more of Examples 1-11 optionally includes wherein the rules engine is further programmed to: determine that the procedure receives a scalar input; generate a procedure translation artifact for the procedure; generate at least one of a function or an action having an input equivalent to the scalar input; and generate an import for the procedure translation artifact to call the at least one of the function or the action.

In Example 13, the subject matter of any one or more of Examples 1-12 optionally includes wherein the rules engine is further programmed to: determine that the procedure receives a complex input; generate a procedure translation artifact for the procedure; generate at least one of a function or an action having an input equivalent to the complex input; and generate an import for the procedure translation artifact to call the at least one of the function or the action.

Example 14 is a method, comprising: accessing, using at least one hardware processor, schema data describing a database schema of an in-memory database, wherein the database schema describes a table, a view, and a procedure; generating, using the at least one hardware processor, a data model comprising a plurality of translation artifacts, wherein a table translation artifact of the plurality of translation artifacts describes a table of the database schema, wherein a view translation artifact describes a view of the database schema, and wherein a procedure translation artifact describes a procedure of the database schema; receiving from a client application a first client request comprising first data describing the view translation artifact; initiating, using the at least one hardware processor, execution of the view at an in-memory database to determine a view result; and sending, using the at least one hardware processor, the view result to the client application.

In Example 15, the subject matter of Example 14 optionally includes generating the table translation artifact for the table; receiving column data for the table, wherein the column data describes a first column of the table and a first data type of the first column; and generating a first property of the table translation artifact for a first column of the table, wherein a first property data type of the first property is equivalent to the first data type of the first column.

In Example 16, the subject matter of Example 15 optionally includes receiving column name data comprising a name of a second column of the table that comprises a foreign key describing a referenced table; and generating a second property of the table translation artifact for the second column, wherein the second property comprises reference data describing a second table translation artifact corresponding to the referenced table.

In Example 17, the subject matter of any one or more of Examples 15-16 optionally includes generating reverse reference data describing a first referring table comprising a first foreign key column referencing a second column of the table; and generating a second property of the table translation artifact, the second property comprising reference data describing the first foreign key column of the first referring table.

In Example 18, the subject matter of any one or more of Examples 14-17 optionally includes receiving view column data describing a plurality of columns of the view, wherein the plurality of columns comprises a first view column, and wherein the view column data also describes a first data type of the first view column; generating a view translation artifact for the view; generating a first property of the view translation artifact, wherein the first property is for a first view column; and setting a first property view data type to the first data type of the first view column.

In Example 19, the subject matter of any one or more of Examples 14-18 optionally includes determining that the procedure is read-write; generating a procedure translation artifact for the procedure; generating an action import for the procedure translation artifact; and generating an action callable by the action import to execute the procedure, wherein the action is capable of modifying the database schema.

Example 20 is a machine-readable medium comprising instructions thereon that, when executed by at least one processor, cause the at least one processor to perform operations comprising: receiving schema data describing a database schema of an in-memory database, wherein the database schema describes a table, a view, and a procedure; generating a data model comprising a plurality of translation artifacts, wherein a table translation artifact of the plurality of translation artifacts describes a table of the database schema, wherein a view translation artifact describes a view of the database schema, and wherein a procedure translation artifact describes a procedure of the database schema; receiving from a client application a first client request comprising first data describing the view translation artifact; executing the view at the in-memory database to determine a view result; and sending the view result to the client application.

What is claimed is:

1. A system, comprising:
at least one processor and a memory in communication with the at least one processor, wherein the at least one processor is programmed to execute:
a rules engine programmed to:
receive schema data describing a database schema of an in-memory database, wherein the database schema describes a table, a view, and a procedure;
generate a data model comprising a plurality of translation artifacts, wherein a table translation artifact of the plurality of translation artifacts describes a table of the database schema, wherein a view translation artifact describes a view of the database schema, and wherein a procedure translation artifact describes a procedure of the database schema;
generate the table translation artifact for the tablet;
receive column data for the table, the column data describing a first column of the table and a first data type of the first column;
generate a first property of the table translation artifact for the first column of a table, a first property data type of the first property being equivalent to the first data type of the first column;
generate reverse reference data describing a first referring; table comprising a first foreign key column referencing a second column of the table; and
generate a second property of the table translation artifact, the second property comprising reference data describing the first foreign key column of the first referring table; and
a mapping service programmed to:
receive from a client application a first client request comprising first data describing the table translation artifact;
retrieve table result data from the table; and
send the table result data to the client application.

2. The system of claim 1, wherein the mapping service is further programmed to:
receive from the client application a second client request comprising second data describing the procedure translation artifact;
execute the procedure at the in-memory database to determine a procedure result; and
send the procedure result to the client application.

3. The system of claim 1, wherein the rules engine is further programmed to:
receive column name data comprising a name of a second column of the table that comprises a foreign key describing a referenced table; and
generate a second property of the table translation artifact for the second column, wherein the second property comprises reference data describing a second table translation artifact corresponding to the referenced table.

4. The system of claim 3; wherein the rules engine is further programmed to configure the data model to permit access to the second table translation artifact only through the table translation artifact.

5. The system of claim 1, wherein the reverse reference data also describes a second referring table comprising a second foreign key column referencing the second column of the table, and wherein the rules engine is further programmed to add second reference data to the second property, the second reference data describing the second foreign key column of the second referring table.

6. The system of claim 1, wherein the rules engine is further programmed to:
receive view column data describing a plurality of columns of the view wherein the plurality of columns comprises a first view column; and wherein the view column data also describes a first data type of the first view column;
generate a view translation artifact for the view;
generate a first property of the view translation artifact, wherein the first property is for the first view column; and
set a first property view data type to the first data type of the first view column.

7. The system of claim 1, wherein the rules engine is further programmed to:
receive view column data describing a plurality of columns of the view wherein the plurality of columns comprises a first view column; and wherein the view column data also describes a first data type of the first view column;
generate a view translation artifact for the view;
determine that the view receives an input parameter;
determine a type of the input parameter;
generate a function import for the view translation artifact, wherein a type of the function import is equivalent to the type of the input parameter; and
generate a function callable by the function import to execute the view.

8. The system of claim 1, wherein the rules engine is further programmed to:
determine that the procedure is read-only;
generate a procedure translation artifact for the procedure;
generate a function import for the procedure translation artifact; and
generate a function callable by the function import to execute the procedure, wherein the function does not modify the database schema.

9. The system of claim 1, wherein the rules engine is further programmed to:
determine that the procedure is read-write;
generate a procedure translation artifact for the procedure;
generate an action to execute the procedure, wherein the action is capable of modifying the database schema; and generate an action import to call the procedure translation artifact.

10. The system of claim 1, wherein the rules engine is further programmed to:
   determine that the procedure receives a scalar input;
   generate a procedure translation artifact for the procedure;
   generate at least one of a function or an action having an input equivalent to the scalar input; and
   generate an import for the procedure translation artifact to call the at least one of the function or the action.

11. The system of claim 1, wherein the rules engine is further programmed to:
   determine that the procedure receives a complex input;
   generate a procedure translation artifact for the procedure;
   generate at least one of a function or an action having an input equivalent to the complex input; and
   generate an import for the procedure translation artifact to call the at least one of the function or the action.

12. The system of claim 1, wherein the table translation artifact describes a security constraint of the table of the database schema.

13. The system of claim 1, wherein the mapping service is further programmed to:
   receive from a client application a second client request comprising first data describing the view translation artifact;
   initiate execution of the view at an in-memory database to determine a view result; and
   send the view result to the client application.

14. A method, comprising:
   accessing, using at least one hardware processor, schema data describing a database schema of an in-memory database, wherein the database schema describes a table; a view, and a procedure;
   generating, using the at least one hardware processor, a data model comprising a plurality of translation artifacts, wherein a table translation artifact of the plurality of translation artifacts describes a table of the database schema, wherein a view translation artifact describes a view of the database schema, and wherein a procedure translation artifact describes a procedure of the database schema;
   generating the table translation artifact for the table;
   receiving column data for the table, wherein the column data describes a first column of the table and a first data type of the first column;
   generating a first property of the table translation artifact for the first column of the table, wherein a first property data type of the first property is equivalent to the first data type of the first column;
   generating reverse reference data describing a first referring table comprising a first foreign key column referencing a second column of the table; and
   generating a second property of the table translation artifact, the second property comprising reference data describing the first foreign key column of the first referring table receiving from a client application a first client request comprising first data describing the table translation artifact;
   retrieve table result data from the table; and
   sending, using the at least one hardware processor; the table result data to the client application.

15. The method of claim 14, further comprising:
   receiving column name data comprising a name of a second column of the table that comprises a foreign key describing a referenced table; and
   generating a second property of the table translation artifact for the second column, wherein the second property comprises reference data describing a second table translation artifact corresponding to the referenced table.

16. The method of claim 14, further comprising:
   receiving view column data describing a plurality of columns of the view, wherein the plurality of columns comprises a first view column, and wherein the view column data also describes a first data type of the first view column;
   generating a view translation artifact for the view;
   generating a first property of the view translation artifact, wherein the first property is for the first view column; and
   setting a first property view data type to the first data type of the first view column.

17. The method of claim 14, further comprising:
   receiving from a client application a second client request comprising first data describing the view translation artifact;
   initiating execution of the view at an in-memory database to determine a view result; and
   sending the view result to the client application.

18. A non-transitory machine-readable medium comprising instructions thereon that, when executed by at least one processor, cause the at least one processor to perform operations comprising:
   receiving schema data describing a database schema of an in-memory database, wherein the database schema describes a table, a view, and a procedure;
   generating a data model comprising a plurality of translation artifacts, wherein a table translation artifact of the plurality of translation artifacts describes a table of the database schema, wherein a view translation artifact describes a view of the database schema, and wherein a procedure translation artifact describes a procedure of the database schema;
   generating the table translation artifact for the table;
   receiving column data for the table, wherein the column data describes a first column of the table and a first data type of the first column;
   generating a first property of the table translation artifact for the first column of the table, wherein a first property data type of the first property is equivalent to the first data type of the first column;
   generating reverse reference data describing a first referring table comprising a first foreign key column referencing a second column of the table; and
   generating a second property of the table translation artifact, the second property comprising reference data describing the first foreign key column of the first referring table
   receiving from a client application a first client request comprising first data describing the table translation artifact;
   retrieve table result data from the table; and
   sending the table result data to the client application.

19. The medium of claim 18, wherein the operations further comprising:
   receiving from a client application a second client request comprising first data describing the view translation artifact;

initiating execution of the view at an in-memory database to determine a view result; and sending the view result to the client application.

\* \* \* \* \*